Figure 1:
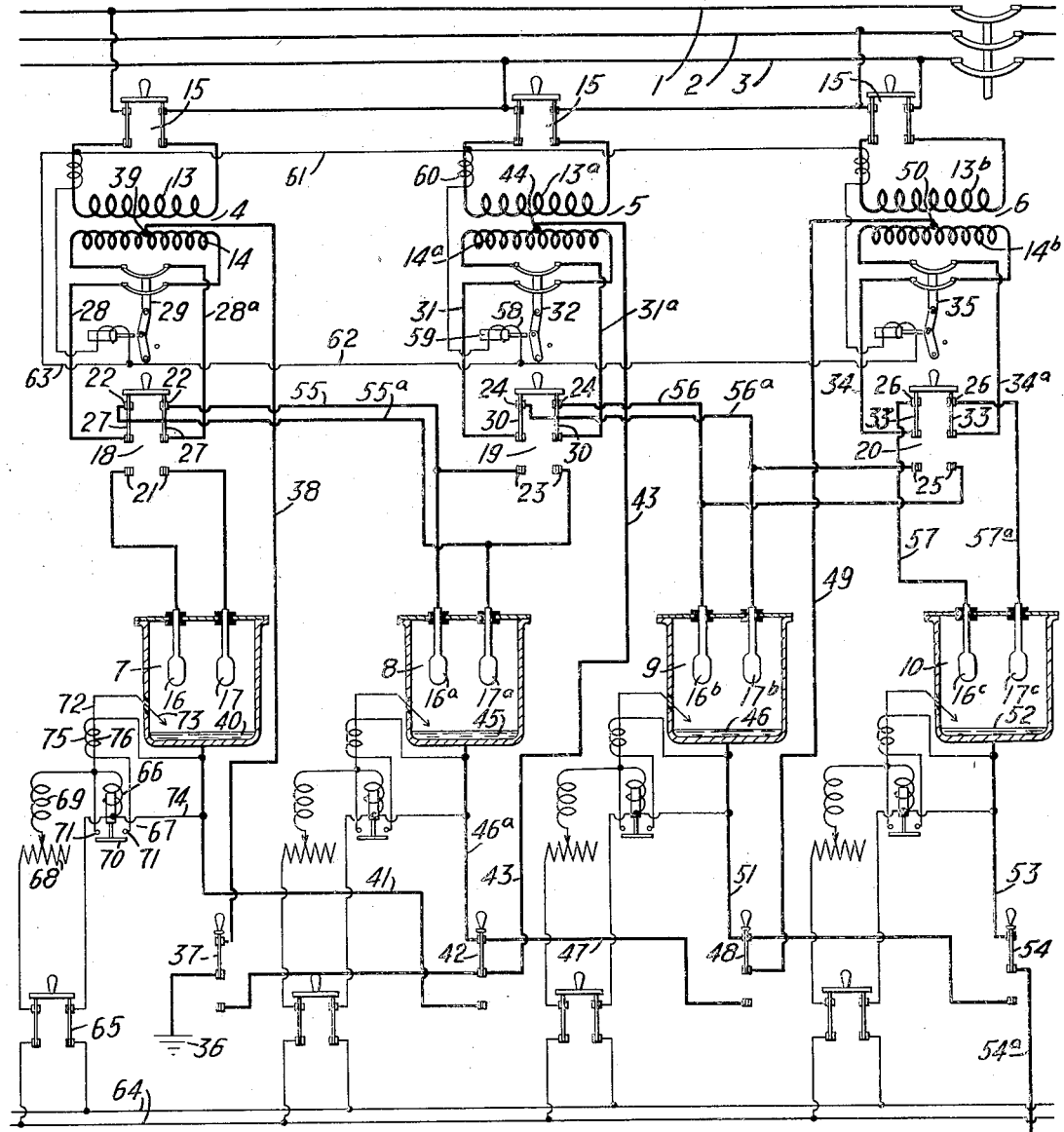

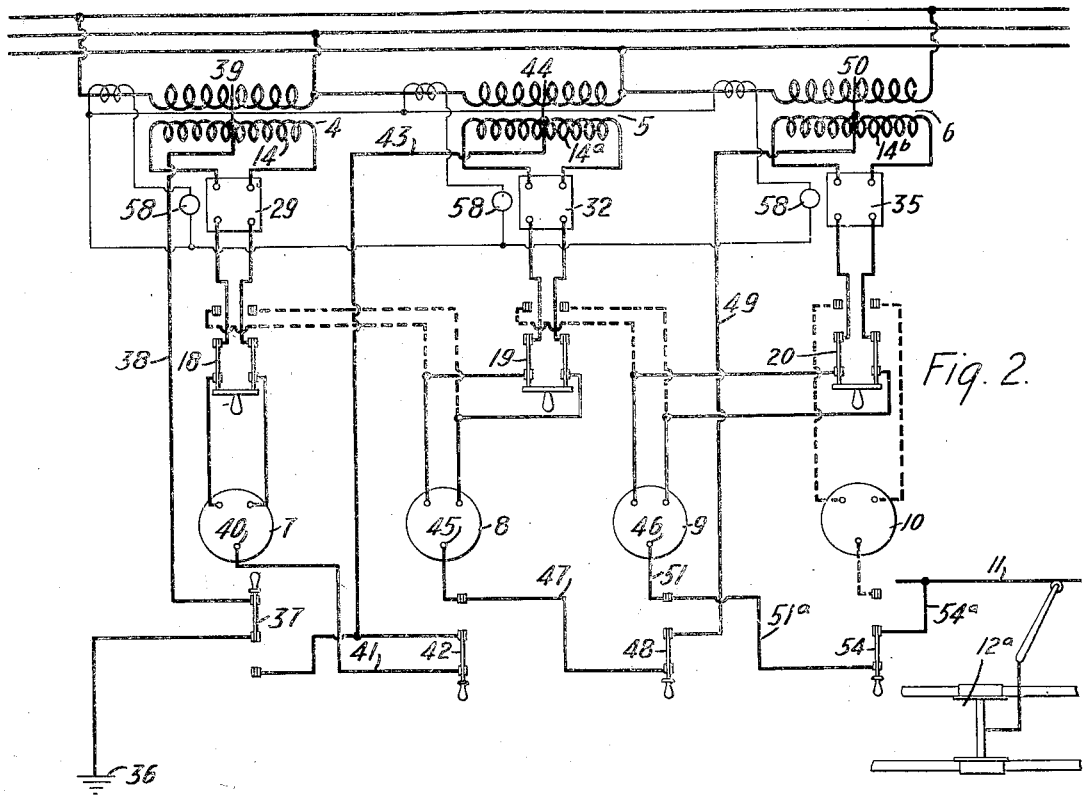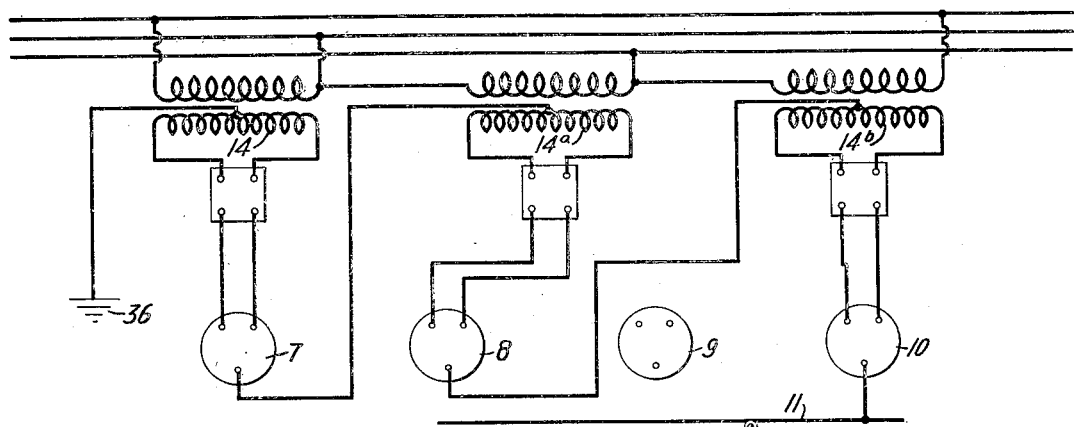

N. W. STORER.
MERCURY RECTIFIER DISTRIBUTING SYSTEM.
APPLICATION FILED FEB. 3, 1916.

1,239,841.

Patented Sept. 11, 1917.
3 SHEETS—SHEET 3.

WITNESSES:
Fred. A. Lind
Geo. W. Hansen.

INVENTOR
Norman W. Storer
BY
Wesley G. Carr
ATTORNEY ns. # UNITED STATES PATENT OFFICE.

NORMAN W. STORER, OF PITTSBURGH, PENNSYLVANIA, ASSIGNOR TO WESTINGHOUSE ELECTRIC AND MANUFACTURING COMPANY, A CORPORATION OF PENNSYLVANIA.

MERCURY-RECTIFIER DISTRIBUTING SYSTEM.

1,239,841. Specification of Letters Patent. Patented Sept. 11, 1917.

Application filed February 3, 1916. Serial No. 76,011.

*To all whom it may concern:*

Be it known that I, NORMAN W. STORER, a citizen of the United States, and a resident of Pittsburgh, in the county of Allegheny and State of Pennsylvania, have invented a new and useful Improvement in Mercury-Rectifier Distributing Systems, of which the following is a specification.

My invention relates to systems of electrical distribution and especially to systems in which vapor and similar current-rectifying devices are employed for transforming alternating currents to direct currents.

More particularly, my invention relates to systems of the aforementioned character which are designed to furnish electrical power to varying loads and which are frequently subjected to severe overload conditions.

In power systems, it is necessary that the supply of electrical power be substantially uninterrupted under all conditions, and, if any interruptions in the supply should occur, that they be of momentary duration only. To effect this continuity of service, it is important to have the electrical apparatus and protective devices associated therewith in the power system of rigid construction and subjected to moderate strains only in order not to be burned out, destroyed or affected in any manner that will require the employment of considerable time in making replacements or repairs of an extensive character. This is especially true in systems of the above-indicated character which are more or less complicated in their arrangement because of the association and coördination of the alternating-current and direct-current apparatus.

In a system employing a plurality of vapor or similar current-rectifying devices which are connected in series relationship to supply a high-voltage rectified or direct current to a railway system, such as will be hereinafter disclosed, I propose protecting the rectifiers and their associated apparatus by employing a number of circuit-interrupting devices. These circuit interrupters are so connected in circuit that, when they are subjected to overload currents, such as are occasioned by overloads on the railway system or internal short circuits in the rectifiers and the like, they will not be required to withstand severe stresses thereby imposed for any length of time. Moreover, these circuit interrupters are so positioned in circuit that only a portion of each one of them will be active at any one time. When a severe overload occurs upon the railway system, the circuit furnishing the rectified current will be interrupted at a number of points by the simultaneous operation of the circuit breakers. In this manner, the duty imposed upon the circuit-protecting devices will be extremely light, while, at the same time, they will afford a most positive protection to the railway system.

Since current-rectifying devices of the vapor-type are subject to internal short circuits that may temporarily disable them under severe service conditions, a reserve supply of current-rectifying devices is furnished, and means are employed whereby the reserve unit or units may be immediately connected in circuit as substitutes for the disabled units in insuring continuity of service, or at least inconsequential interruptions only.

To afford the maximum protection to the railway system, it is essential that, when the alternating-current supply system is of a polyphase character, the connections associated with the rectifiers shall be of such character that they may be selectively connected to the separate phase conductors of the alternating-current polyphase supply system. Similarly, the transformers, which are necessarily associated with the vapor rectifiers, are protected against short-circuit currents by the aforementioned circuit-interrupting devices furnishing protection to the current rectifiers.

If, for any reason, it is desired to furnish rectified or direct current of lower voltage than normal to the railway system which is connected, by means of the circuits arranged in accordance with my invention, to the alternating-current supply system, means are incorporated for selectively disassociating from circuit any one transformer and any one active rectifier, as is desired.

Figure 4:
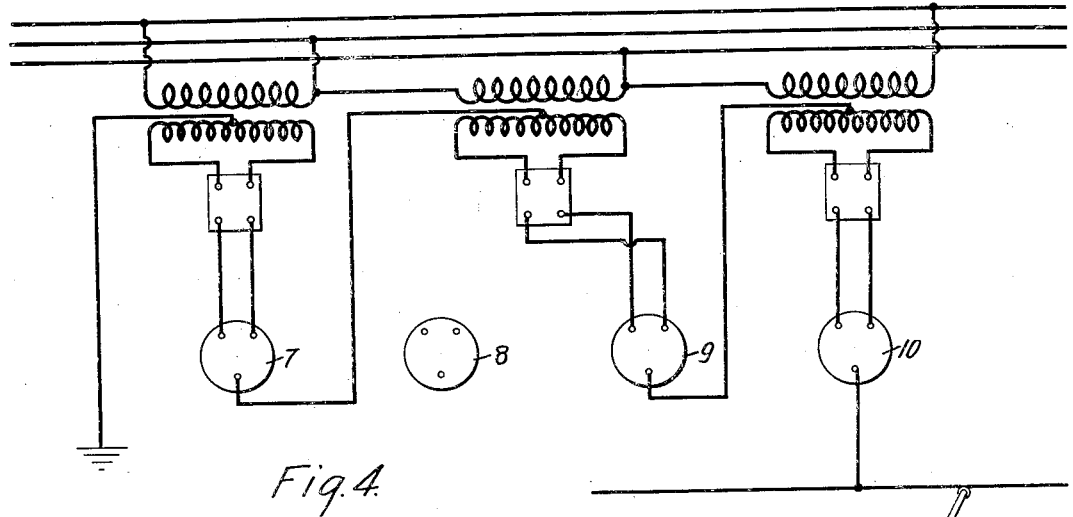
Figure 5:
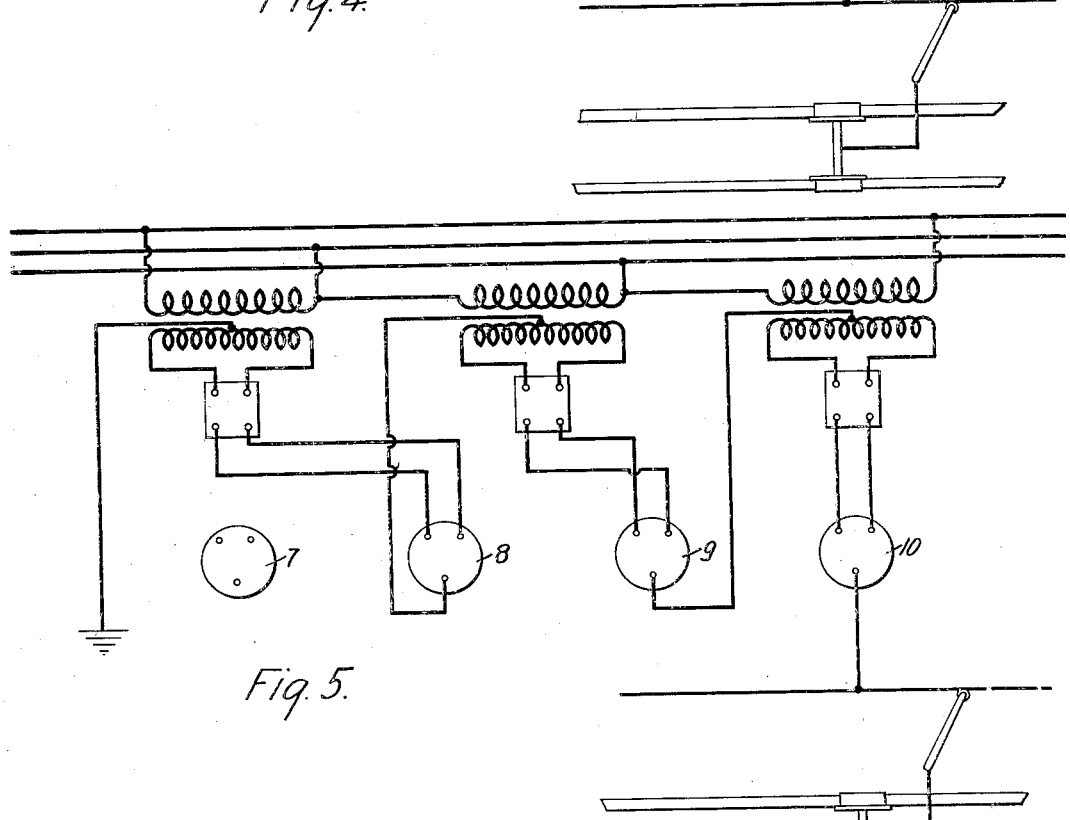

For accomplishing the above-indicated results, I have invented the system of electrical distribution which is disclosed in the following description and illustrated in the accompanying drawings of which Figure 1 is a diagrammatic representation of a complete system embodying a form of my invention; Fig. 2 is a simplified view of the system shown in Fig. 1 having the circuit connections so arranged that the inactive rectifying device is disconnected from circuit; Figs. 3, 4 and 5 are views similar to Fig. 2 and showing the circuit connections in their simplest form when the rectifiers are selectively associated with the different phase conductors of the alternating-current supply system.

Referring to Fig. 1, a polyphase alternating current system, comprising the three-phase conductors 1, 2 and 3, is connected through transformers 4, 5 and 6 and any selected three units or rectifying devices 7, 8, 9 and 10 to a direct-current railway system consisting of a trolley conductor 11 and a track 12. It is intended that the railway circuit be operated at a very high direct-current voltage, such as 5000 volts, and, to this end, the aforementioned rectifying units are connected in series relationship, as will be hereinafter described, to furnish rectified currents of the required voltage to the railway system.

Each of the transformers 4, 5 and 6 comprises primary windings 13, $13^a$ and $13^b$ and secondary windings 14, $14^a$ and $14^b$, respectively. The primary windings 13, $13^a$ and $13^b$ are connected in delta formation to the three phases of the alternating-current supply system through double-pole switches 15. Since each of the rectifying units 7, 8, 9 and 10 comprises two anodes 16 and 17, $16^a$ and $17^a$, $16^b$ and $17^b$ and $16^c$ and $17^c$, respectively, which, as is well known, are connected to the alternating current circuits, one of the said rectifiers serves as a reserve unit, inasmuch as a single rectifier only is normally associated with each phase of the three-phase alternating-current supply system. To selectively associate the rectifying units with the separate phase conductors of the supply system, double-pole, double-throw switches 18, 19 and 20 are provided which are adapted to connect the rectifying units to the secondary windings of the transformers. The double-throw, double-pole switch 18, through a pair of contact members 21, is adapted to be connected to the rectifier 7 and, through a pair of contact members 22, is adapted to be connected to the rectifier 8. Similarly, the switch 19 is adapted to be connected, through a pair of contact members 23, to the rectifier 8 and, through a pair of contact members 24, to the rectifier 9. The switch 20, through a pair of contact members 25, is adapted to be connected to the rectifier 9, and, through a pair of contact members 26, is adapted to be connected to the rectifier 10. With the switch 18 in the position shown, blade members 27 thereof are connected through conductors 28 and $28^a$ to the terminals of the secondary winding 14 of the transformer 4. A double-pole circuit interrupter 29 is inserted between the secondary winding 14 and the switch member 18 and is so adapted that, on operation of the circuit breaker, both terminals of the secondary winding 14 are simultaneously disconnected from circuit. In a similar manner, blade members 30 of the double-pole, double-throw switch 19 are connected by means of conductors 31 and $31^a$ to the terminals of the secondary winding $14^a$ of the transformer 5. A circuit interrupter 32 is inserted between the secondary winding $14^a$ and the switch 19, and blade members 33 of the switch 20 are connected through conductors 34 and $34^a$ and a double-pole circuit interrupter 35 to the terminals of the secondary winding $14^b$ of the transformer 6.

A ground connection 36 may be connected through a single-pole, double-throw switch 37 and a conductor 38 to a mid-point tap 39 on the secondary winding 14. Under normal operating conditions, a plurality of current rectifiers may be connected in series relationship by interconnecting the cathodes of the rectifiers to mid-point taps on the proper secondary windings of the transformers which are associated with the rectifiers. To illustrate, a cathode 40 of the rectifier 7 may be connected through a conductor 41, a single-pole, double-throw switch 42, and a conductor 43 to a mid-point tap 44 on the transformer secondary winding $14^a$. A cathode 45 of the current rectifier 8 may be connected, by means of a conductor $46^a$, a conductor 47, a single-pole double-throw switch 48, and a conductor 49, to a mid-point tap 50 on the transformer secondary winding $14^b$. Similarly, a cathode 46 of the current rectifier 9 may be connected, by means of a conductor 51, the single-pole, double-throw switch 48 and the conductor 49, to the aforementioned mid-point tap 50 of the transformer secondary winding $14^b$. A cathode 52 of the current rectifier 10 is connected to a conductor 53 which, under certain conditions, as will be hereinafter described, may be connected to the trolley conductor 11 through a single-pole, double-throw switch 54.

With the switches in the positions shown in Fig. 1, the three rectifiers 8, 9 and 10 are connected in series-circuit relationship to furnish high-voltage rectified current to the railway circuit. To illustrate, the ground connection 36, which may be considered as electrically connected to the rails 12 of the railway system, is connected through the switch 37, the conductor 38, the transformer secondary winding 14, the circuit interrupter 29, the switch 18 and conductors 55 and $55^a$ to the anodes $16^a$ and $17^a$, respectively, of the current rectifier 8. The cathode 45 of the current rectifier 8 is connected, through the conductor $46^a$, the switch 42, the conductor 43, the secondary winding $14^a$, the circuit interrupter 32, the switch 19 and conductors 56 and $56^a$, to the anodes $16^b$ and $17^b$, respectively, of the current rectifier 9. The cathode 46 of the current rectifier 9 is connected through the conductor 51, the switch 48, the conductor 49, the secondary winding 14$^b$ of the transformer 6, the circuit interrupter 35, the switch 20 and conductors 57 and 57$^a$ to the anodes 16$^c$ and 17$^c$ of the current rectifier 10. The cathode 52 of the current rectifier 10 is connected, by means of the conductor 53, the switch 54 and a conductor 54$^a$, to the trolley conductor 11 of the railway system.

From the foregoing description, it will be apparent that the three rectifiers 8, 9 and 10, in this instance, are connected in series-circuit relationship through the several secondary windings of the transformers 4, 5 and 6 to the railway system, each of the rectifiers being protected by means of the circuit interrupters 29, 32 and 35, respectively. The circuit interrupters are so connected in circuit that both terminals of the associated secondary transformer winding are simultaneously disconnected when they operate. Moreover, three double-pole circuit breakers are normally connected in series circuit with the railway system and, consequently, each one of the circuit interrupters is subjected to a light duty, especially as each breaker will always operate with zero current passing through one of its poles, while the current passing through the other pole of the breaker will subsist only for a portion of an alternation. This results from the fact that the two halves of the secondary windings of the transformers are alternately energized by reason of the reversal in the alternating current wave which is being rectified by the current rectifiers. Therefore, the duty imposed upon the circuit interrupters is extremely light and, at the same time, the most positive protection is offered to the railway circuit. Again, each of the circuit breakers protects the respective phases of the alternating-current supply system and the associated transformers from internal short circuits arising in the rectifiers by reason of their positions in the circuit.

Each of the circuit breakers is automatically actuated by means of a solenoid 58 provided with a movable plunger 59. Current is supplied to the solenoids 58 through secondary windings 60 which embrace the leads of the primary windings of the transformers, substantially as shown. The secondary windings 60 are connected in closed circuit with the solenoids 58 by means of conductors 61, 62 and 63. This method of having a circuit interrupter actuated in accordance with the current flow in an associated circuit is well known in the art. The secondary windings 60 of the current transformers are connected in such manner as to respond to the current flow in the primary windings 13, 13$^a$ and 13$^b$, inasmuch as these windings, in this particular instance, serve as the low-voltage and, consequently, the high-current-carrying windings of the transformers 4, 5 and 6, respectively.

Auxiliary circuits are supplied for each of the rectifiers in order to start the rectifiers and to provide active keep-alive circuits. Inasmuch as the auxiliary circuits for the rectifiers are identical, my explanation will be confined to the keep-alive circuit of the current rectifier 7. Mains 64 are supplied, in this instance, with rectified current from a mercury rectifier of the usual type (not shown). On closing a double-pole switch 65, current is furnished to a winding 66 of a relay 67, the current flow through this circuit being regulated by a resistor 68 and a reactance element 69. When a bridging member 70 of the relay 67 engages contacts 71 of the relay, a circuit is established through a conductor 72, a keep-alive electrode 73, the cathode 40 and a conductor 74. Simultaneously, a circuit is established through a winding 75 of a holding-in solenoid 76 of the usual type. The solenoid 76 withdraws the keep-alive electrode 73, thereby initially establishing the arc within the rectifier 7 and furnishing a keep-alive that is essential to the continued operation of the rectifier.

It will be apparent from the foregoing description that each of the rectifiers is protected by a circuit interrupter which responds to the current flow through the rectifier. In consequence thereof, the associated transformer and phase of the alternating-current supply circuit is protected as well as the rectifier. This protection is afforded against both internal short circuits that may develop within the rectifier and overload conditions upon the railway system. In the latter instance, however, adequate protection is afforded for all of the rectifiers since the circuit interrupters are connected in series-circuit relationship and operate simultaneously to disconnect the circuits for the rectified current at a multiplicity of points when severe overloads obtain upon the railway system. Each of the circuit breakers is subjected to a very light duty since one pole thereof is inactive while the other pole is active only during a portion of an alternation.

In Fig. 2, I have shown a simplified form of the system of Fig. 1, the rectifier units 7—8—9 and 10 and the circuit interrupters 29, 32 and 35, with their trip mechanisms 58, being diagrammatically indicated. With the single-pole switches 37, 42, 48 and 54 and the two-pole, double-throw switches 18, 19 and 20 in the positions indicated, the current rectifiers 7, 8 and 9 are connected in series relationship with one another through the transformers. In this instance, a locomotive 12$^a$ receives power from the trolley conductor 11 which is connected through the conductor 54ª, the switch 54 and conductors 51ª and 51 to the cathode 46 of the rectifier 9. The rectifier 9 is connected, as indicated by the full lines, through the switch 20 to the terminals of the secondary winding 14ᵇ of the transformer 6. The mid-point 50 of the secondary winding 14ᵇ is connected through the conductor 49, the switch 48, and the conductor 47 to the cathode 45 of the rectifier 8. The anodes of the rectifier 8 are connected through the conductors indicated by the full lines and the switch 19 to the terminals of the secondary winding 14ª of the transformer 5. The mid-point 44 of the secondary winding 14ª is connected through the conductor 43ª, the switch 42 and the conductor 41 to the cathode 40 of the rectifier 7. The anodes of rectifier 7 are connected through the conductors indicated by the full lines and the switch member 18 to the terminals of the secondary winding 14 of the transformer 4. The mid-point 39 of the secondary winding 14 is connected through the conductor 38 and the switch member 37 to the ground connection 36.

From the foregoing description of Fig. 2, it will be noted that the rectifier 10 serves as the reserve rectifier unit and, with the system of connections obtaining in this arrangement, that the rectifier 10 is inactive during normal operation of the railway system. The rectifiers 7, 8 and 9 are protected by their associated circuit interrupters which respond to the current flow in the primary windings of the separate transformers. The circuit interrupters protect the rectifiers against both internal short circuits and overloads on the railway system. At the same time, the several transformers and phase-conductors of the alternating-current transmission system are similarly protected by the circuit interrupters. The same advantages are obtained by the particular method of interconnecting the circuit interrupters shown in Fig. 2, as explained in connection with the system of Fig. 1, namely, that the three circuit interrupters are connected in series relationship with the railway circuit in order that the rectified current circuits may be simultaneously broken at a multiplicity of points when severe overloads obtain upon the railway circuit.

The system shown in Fig. 3 is considerably simplified over the systems shown in the preceding figures, inasmuch as the switches and all the unnecessary and inactive conductors are eliminated, thereby permitting the several circuits to be readily traced. When the movable member of the switch 54 occupies its upper position, the rectifier 10 is connected directly to the trolley conductor 11. By keeping the movable members of the switches 42 and 48 in their lower positions, moving the switch 20 to occupy its upper position and the switches 18 and 19 their lower positions, the rectifier 10 is interconnected through the secondary winding 14ᵇ to the rectifier 8 and, similarly, the rectifier 8 is interconnected through the secondary winding 14ª to the rectifier 7, which, in turn, is connected through the secondary winding 14 to the ground connection 36. In this instance, the rectifier 9 is inactive and serves as the reserve unit of the system. The rectifiers 7 and 8 are associated with the phase conductors indicated in Fig. 2, while the rectifier 10 has been substituted for the rectifier 9 of Fig. 2.

In Fig. 4, the rectifier 8 serves as the reserve rectifier and remains inactive. It is disconnected from circuit, and the rectifiers 7, 9 and 10 are connected in series relationship to furnish power to the railway system by manipulating the switches in the following manner: The switches 54 and 48 of Fig. 2 occupy their upper positions, the switch 42 occupies its lower position, and the switches 19 and 20 occupy their upper positions, while the switch 18 occupies its lower position. With the connections thus indicated, the rectifiers 7, 9 and 10, as mentioned above, are connected in series relationship to furnish power to the railway system.

In Fig. 5, I have shown the electrical connections obtaining when the rectifier 8 is disconnected from circuit and serves as the reserve unit of the system. In this instance, the switches 54, 48 and 42 of Fig. 2, and, similarly, the switches 18, 19 and 20 occupy their upper positions, thereby disconnecting the rectifier 7 from circuit. These connections may be readily traced by referring to Fig. 2.

From the foregoing description, it will be apparent that any one of the four rectifiers may be disconnected from circuit at will, and another rectifier substituted therefor in order to insure continuity of service, the system of connections as described herein permitting the rectifiers to be selectively associated with the different phases of the alternating-current supply system.

While I have shown and described in detail a distributing system embodying a form of my invention, it will be apparent that many modifications may be made therein without departing from the spirit and scope of the appended claims.

I claim as my invention:

1. A system of distribution comprising an alternating-current supply circuit, a transformer having its primary winding connected thereto, a current rectifier having its anodes connected to terminals of a secondary winding of the transformer, a distributing circuit for the rectified current connected to the rectifier cathode and the secondary winding of the transformer, and a single device for protecting the rectifier and transformer against both internal short circuits and overloads on the distributing circuit.

2. A system of distribution comprising an alternating-current supply circuit, a transformer having its primary winding connected thereto, a vapor rectifying device having its anodes connected to a secondary winding of the transformer, a distributing circuit for the rectified current which is connected to the rectifier cathode and to an intermediate tap on said secondary winding, and a double-pole circuit interrupter inserted between the anodes of the rectifier and the transformer secondary winding for protecting the rectifier and transformer against both internal short circuits and overloads on the distributing circuit.

3. A system of distribution comprising an alternating-current supply circuit, transformers having their primary windings connected thereto, current rectifiers having their anodes connected to the terminals of secondary windings of the transformers, a distributing circuit for the rectified current connected to the cathodes of the rectifier and mid-points on the transformer secondary windings, and a double-pole circuit interrupter inserted between the anodes of each rectifier and the corresponding transformer secondary winding for protecting each rectifier against internal short circuits and overloads on the distributing circuit.

4. A system of distribution comprising a polyphase alternating-current supply circuit, transformers having their primary windings connected to different phases thereof, current rectifiers having their anodes connected to the terminals of secondary windings of the transformers, said rectifiers being connected in series relationship through conductors extending between the rectifier cathodes and mid-points on the transformer secondary windings, a distributing circuit for the rectified current, and means for protecting the separate phases of the alternating-current supply circuit and the rectifiers from both internal short circuits in the rectifiers and overloads on the distributing circuit for the rectified current.

5. A system of distribution comprising an alternating-current supply circuit, a plurality of transformers having their primary windings connected thereto, a plurality of current rectifiers having their anodes connected to terminals of the secondary windings of said transformers, double-pole circuit interrupters inserted intermediate the rectifier anodes and the terminals of said secondary windings, a distributing circuit for the rectified current which is interconnected to the cathodes of the rectifiers and intermediate taps on the transformer secondaries, and means dependent upon the current flow in the direct-current distributing circuit for actuating said circuit interrupters, whereby both the active and the inactive terminals of the secondary windings may be simultaneously disconnected from circuit.

6. A system of distribution comprising a polyphase alternating-current supply circuit, transformers having their primary windings connected to different phases thereof, current rectifiers having their anodes connected to the terminals of the secondary windings of the transformers, said rectifiers being connected in series relationship through conductors extending between the rectifier cathodes and mid-points on the transformer secondary windings, a distributing circuit for the rectified current connected directly to the series connected rectifiers, and double-pole circuit interrupters inserted between the anodes of the rectifiers and the terminals of the transformer secondary windings for simultaneously breaking the circuits of the rectified current at a multiplicity of points.

7. A system of distribution comprising a polyphase alternating-current supply circuit, a transformer for each phase thereof having its primary winding connected to its respective phase conductors, a plurality of current rectifiers having their anodes connected to the secondary windings of the transformers, said rectifiers being connected in series relationship through conductors extending between the rectifier cathodes and mid-points on the transformer secondary windings, a distributing circuit for the rectified current, double-pole circuit interrupters associated with the transformer secondary windings, and connections for selectively associating each pair of phase-conductors with any one of a plurality of rectifiers.

In testimony whereof, I have hereunto subscribed my name this 28th day of Jan., 1916.

NORMAN W. STORER.